(12) United States Patent
Kim

(10) Patent No.: US 11,904,767 B2
(45) Date of Patent: Feb. 20, 2024

(54) SYSTEM AND METHOD FOR ILLUMINATING CHARGING PORT OF ELECTRIC VEHICLE

(71) Applicants: Hyundai Motor Company, Seoul (KR); Kia Corporation, Seoul (KR)

(72) Inventor: Sinkook Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 183 days.

(21) Appl. No.: 17/544,147

(22) Filed: Dec. 7, 2021

(65) Prior Publication Data

US 2023/0103181 A1 Mar. 30, 2023

(30) Foreign Application Priority Data

Sep. 27, 2021 (KR) .......................... 10-2021-0127161

(51) Int. Cl.
| | | |
|---|---|---|
| *B60Q 3/30* | (2017.01) | |
| *B60L 53/16* | (2019.01) | |
| *B60Q 3/80* | (2017.01) | |
| *E05D 3/02* | (2006.01) | |
| *E05D 5/06* | (2006.01) | |
| *E05D 11/00* | (2006.01) | |
| *H05B 47/115* | (2020.01) | |

(Continued)

(52) U.S. Cl.
CPC ............... *B60Q 3/30* (2017.02); *B60L 53/16* (2019.02); *B60Q 3/80* (2017.02); *E05D 3/02* (2013.01); *E05D 5/062* (2013.01); *E05D 11/0054* (2013.01); *E05D 11/0081* (2013.01); *F21V 23/002* (2013.01); *H05B 47/115* (2020.01); *H05B 47/16* (2020.01); *E05D 2005/067* (2013.01); *E05Y 2201/11* (2013.01); *E05Y 2800/106* (2013.01); *E05Y 2900/534* (2013.01)

(58) Field of Classification Search
CPC .......... B60Q 3/30; B60Q 3/80; B60Q 1/0076; B60Q 1/543; B60Q 1/2669; B60Q 1/0088; B60Q 1/2661; B60L 53/16; B60L 2250/10; B60L 58/12; E05D 3/02; E05D 5/062; E05D 11/0054; E05D 11/0081; E05D 2005/067; F21V 23/002; H05B 47/115; H05B 47/16; H05B 45/60; H05B 47/20; E05Y 2201/11; E05Y 2800/106; E05Y 2900/534; Y02T 10/70; Y02T 10/7072; Y02T 90/14; H01R 13/717; H01R 2201/26; B60Y 2200/91
USPC ....................................................... 340/425.5
See application file for complete search history.

(56) References Cited

U.S. PATENT DOCUMENTS

| | | | | |
|---|---|---|---|---|
| 8,740,283 B2* | 6/2014 | Yamamaru | ............... | B60K 1/04 296/136.01 |
| 8,845,001 B2* | 9/2014 | Kotama | ................. | B60K 15/04 296/97.22 |

(Continued)

FOREIGN PATENT DOCUMENTS

CN 104787127 A * 7/2015

*Primary Examiner* — Eric Blount
(74) *Attorney, Agent, or Firm* — Slater Matsil, LLP

(57) ABSTRACT

An embodiment system for illuminating a charging port of an electric vehicle is provided. The charging port is provided in a vehicle body for supplying electrical power to a vehicle driving battery, and the system includes a charging port door configured to open and close the charging port, and a lamp device disposed on the charging port door and configured to illuminate the charging port.

15 Claims, 11 Drawing Sheets

(51) Int. Cl.
*H05B 47/16* (2020.01)
*F21V 23/00* (2015.01)

(56) References Cited

U.S. PATENT DOCUMENTS

| | | | | |
|---|---|---|---|---|
| 9,457,673 | B2* | 10/2016 | Masuda | B60L 50/40 |
| 10,052,947 | B2* | 8/2018 | Herrmann | B60K 15/05 |
| 10,557,298 | B2* | 2/2020 | Dillinger | E05F 15/63 |
| 10,717,383 | B2* | 7/2020 | Ueno | B60Q 1/543 |
| 11,072,252 | B2* | 7/2021 | Winkler | B60K 35/00 |
| 11,263,836 | B1* | 3/2022 | Badger, II | G07C 5/0825 |
| 2010/0026238 | A1* | 2/2010 | Suzuki | B60Q 3/30 |
| | | | | 320/109 |
| 2010/0045450 | A1* | 2/2010 | Suzuki | B60L 15/007 |
| | | | | 340/438 |
| 2013/0077328 | A1* | 3/2013 | Hook | B60L 53/16 |
| | | | | 362/459 |
| 2013/0153257 | A1* | 6/2013 | Yamamaru | H01R 13/447 |
| | | | | 174/67 |
| 2013/0326955 | A1* | 12/2013 | Kotama | E05B 83/34 |
| | | | | 49/13 |
| 2015/0191093 | A1* | 7/2015 | Yamamaru | B60L 53/16 |
| | | | | 320/109 |
| 2017/0253174 | A1* | 9/2017 | Hook | B60Q 1/00 |
| 2018/0142512 | A1* | 5/2018 | Dillinger | B60Q 3/30 |
| 2021/0288455 | A1* | 9/2021 | Stack | B60Q 1/2661 |

* cited by examiner

SYSTEM AND METHOD FOR ILLUMINATING CHARGING PORT OF ELECTRIC VEHICLE

CROSS-REFERENCE TO RELATED APPLICATIONS

This application claims the benefit of Korean Patent Application No. 10-2021-0127161, filed on Sep. 27, 2021, which application is hereby incorporated herein by reference.

TECHNICAL FIELD

The present disclosure relates to an electric vehicle.

BACKGROUND

In general, an electric vehicle is charged by plugging a charger into the charging port for charging. It is desirable to provide an illumination system that illuminates the charging port such that the charger outlet may be easily plugged into the charging port at night.

Conventionally, the illumination position is positioned very close to the charging port, such as a top of the charging port, and there is a disadvantage that the lighting range is narrow, it is not easy to replace the lamp mechanism, etc.

Therefore, if a system for illuminating a charging port of an electric vehicle that illuminates a wider range and is convenient for maintenance is provided, it may be expected that the convenience of using the electric vehicle will be improved. Therefore, if a lighting system for a charging port of an electric vehicle that illuminates in a wider range and maintenance is convenient is provided, it may be expected that the convenience of use of the electric vehicle is improved.

The above information disclosed in this Background section is only for enhancement of understanding of the background of the invention, and therefore it may contain information that does not form the prior art that is already known to a person of ordinary skill in the art.

SUMMARY

The present disclosure relates to an electric vehicle. Particular embodiments relate to system and method for illuminating a charging port of an electric vehicle.

Embodiments of the present disclosure provide a system and method for illuminating a charging port of an electric vehicle capable of illuminating the charging port in a wider range and improving maintenance and convenience.

A system according to an embodiment is for illuminating a charging port of an electric vehicle, wherein the charging port is provided in a vehicle body for supplying electrical power to a vehicle driving battery. The system according to an embodiment includes, a charging port door operable to open and close the charging port, and a lamp device disposed on the charging port door and configured to illuminate the charging port.

The lamp device may be configured to illuminate downward from the charging port door when opened.

The charging port door may be hinge-coupled to the vehicle body through a hinge device to be opened upward. The lamp device may be formed on an inner surface of the charging port door, and configured to emit light from the inner surface of the charging port door and illuminate downward when the charging port door is open.

The system according to an embodiment may further include, a lamp wiring disposed along the hinge device to supply power to the lamp device, and a hinge cover configured to cover the lamp wiring.

The hinge device may include a hinge shaft configured to provide hinge coupling, a hinge body configured to rotate about the hinge shaft, and a hinge arm configured to connect the hinge body and the charging port door.

The hinge arm may include at least one rib protruding toward the hinge cover. The lamp wiring may be fixed between the hinge arm and the hinge cover by the at least one rib.

A wiring holding indentation may be formed between the hinge cover and the hinge body, the lamp wiring may be fixed to the wiring holding indentation as the hinge cover is coupled to the hinge arm, and the lamp wiring may lead to inside of the vehicle through the wiring holding indentation.

A portion of the lamp wiring from the wiring holding indentation toward the inside of the vehicle may be fixed by being tightly held by a holding member formed on a hinge housing of the hinge device.

The hinge arm may include a first arm protruding from the hinge body, a second arm configured to connect the first arm and the charging port door, and a third arm extending in parallel with the charging port door from an end of the second arm, and coupled with the charging port door. The hinge cover may include a first cover configured to cover the first arm, a second cover configured to cover the second arm, and a third cover configured to cover the third arm.

A first sliding groove may be formed on the first arm, and the first cover may be slidably coupled with the first arm through the first sliding groove. A second sliding groove may be formed on the second arm, and the second cover may be slidably coupled with the second arm through the second sliding groove.

A light transmitting window may be formed at the hinge cover, and the lamp device may be coupled with an inner surface of the hinge cover to illuminate through the light transmitting window.

The system according to an embodiment may further include a door sensor configured to detect opening and closing of the charging port door, and a lamp controller configured to control supplying of electricity to the lamp device based on a signal from the door sensor.

The lamp controller may be configured to control the supplying of electricity to turn on the lamp device when the opening of the charging port door is detected, and to turn off the lamp device when the closing of the charging port door is detected.

The lamp controller may be configured to turn off the lamp device after a preset time period when a start of charging of the vehicle driving battery is detected after turning on the lamp device.

The lamp controller may be further configured to, after turning off the lamp device after the preset time period, generate a preset warning signal through the lamp device when an abnormality of the charging is detected.

The lamp controller may be further configured to, after turning off the lamp device after the preset time period, turn on the lamp device when a finish of the charging is detected.

A method according to an embodiment is for illuminating a charging port of an electric vehicle provided with a charging port door operable to open and close a charging port for supplying electricity to a vehicle driving battery and provided with a lamp device disposed on the charging port door. The method according to an embodiment includes detecting opening of the charging port door, turning on the lamp device to illuminate downward from the charging port door toward the charging port, when the opening of the charging port door is detected, detecting closing of the charging port door, and turning off the lamp device when the closing of the charging port door is detected.

The method according to an embodiment may further include detecting a start of charging the vehicle driving battery after the turning on the lamp device, and turning off the lamp device after a preset time period after detecting the start of the charging.

The method according to an embodiment may further include, after the turning off the lamp device after the preset time period, detecting an abnormality of the charging, and generating a preset warning signal through the lamp device when the abnormality of the charging is detected.

The method according to an embodiment may further include, after the turning off the lamp device after the preset time period, detecting a finish of the charging, and turning on the lamp device when the finish of the charging is detected.

According to a system and method for illuminating a charging port of an electric vehicle according to an embodiment, by illuminating the charging port from the charging port door, it is possible to illuminate the charging port in a wider range.

In addition, according to a system and method for illuminating a charging port of an electric vehicle according to an embodiment, by illuminating the charging port downward from the charging port door, glare or the like is not caused in the user's field of view, and the convenience of use may be improved.

In addition, according to a system and method for illuminating a charging port of an electric vehicle according to an embodiment, by effectively disposing the lamp wiring connected to the lamp device disposed on the charging port door, the stability of the charging port illumination may be improved.

In addition, according to a system and method for illuminating a charging port of an electric vehicle according to an embodiment, the lamp device may be easily replaced when an abnormality occurs in the lamp device disposed on the charging port door.

In addition, according to a system and method for illuminating a charging port of an electric vehicle according to an embodiment, user convenience may be improved by effectively turning on and off the lamp device according to the opening and closing of the charging port door during the charging process of the electric vehicle.

Other effects that may be obtained or are predicted by an embodiment will be explicitly or implicitly described in a detailed description of the present disclosure. That is, various effects that are predicted according to an exemplary embodiment will be described in the following detailed description.

Figure 1:
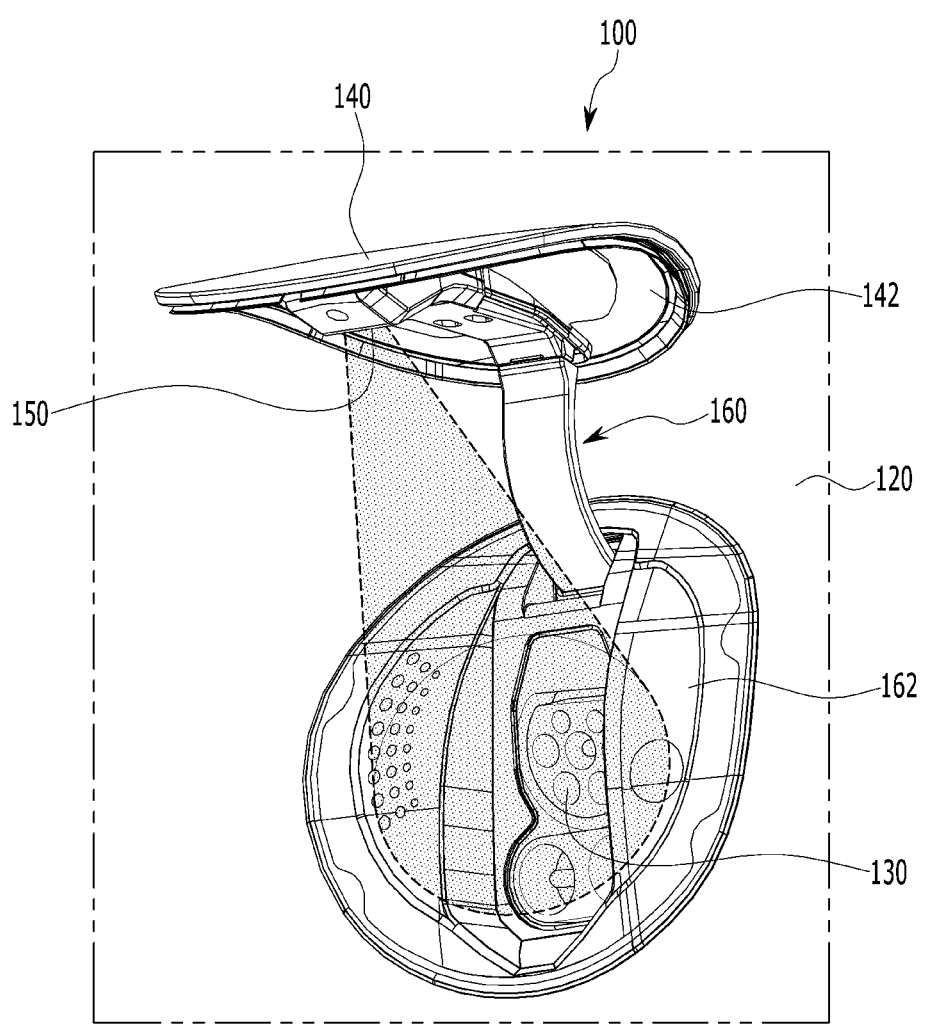
FIG. 1 is a drawing showing the visible configuration of a system for illuminating a charging port of an electric vehicle according to an embodiment.

The following reference information may be used in connection with the drawings for further understanding of the preferred embodiments.

100: charging port illumination system
110: vehicle driving battery
112: lamp battery
120: vehicle body
130: charging port
132: charging port housing
140: charging port door
142: door inner panel
150: lamp device
152: lamp
154: lamp case
156: connector
158: lamp wiring
160: hinge device
162: hinge housing
164: holding member
166: hinge shaft
168: hinge body
170: hinge arm
171: first arm
172: second arm
173: third arm
176: first sliding groove
177: second sliding groove
179: rib
180: hinge cover
181: first cover
182: second cover
183: third cover
185: wiring holding indentation
190: light transmitting window
200: lamp controller
210: door sensor
300: vehicle interface

DETAILED DESCRIPTION OF ILLUSTRATIVE EMBODIMENTS

Hereinafter, exemplary embodiments disclosed in the present specification will be described in detail with reference to the accompanying drawings. In the present specification, the same or similar components will be denoted by the same or similar reference numerals, and a repeated description thereof will be omitted.

In describing exemplary embodiments of the present specification, when it is determined that a detailed description of the well-known art associated with embodiments of the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

Terms such as "unit", "part" or "portion", "-er", and "module" for components used in the following description are used only in order to easily describe the specification. Therefore, these terms do not have meanings or roles that distinguish them from each other in and of themselves. In addition, the terms "unit", "part" or "portion", "-er", and "module" in the specification refer to a unit that processes at least one function or operation, which may be implemented by hardware, software, or a combination of hardware and software.

As used herein, the singular forms are intended to include the plural forms as well, unless the context clearly indicates otherwise. As used herein, the term "and/or" includes any one or all combinations of one or more related items.

The term "electric vehicle" used in the present disclosure means a vehicle that is provided with a vehicle driving battery storing electrical power for driving the vehicle and also provided with a charging port to charge the vehicle driving battery, and may include a battery electric vehicle, a plug-in hybrid vehicle, and the like.

Hereinafter, embodiments of the present disclosure are described in detail with reference to the drawings.

FIG. 1 illustrates a visible configuration of a system for illuminating a charging port of an electric vehicle according to an embodiment.

Figure 2:
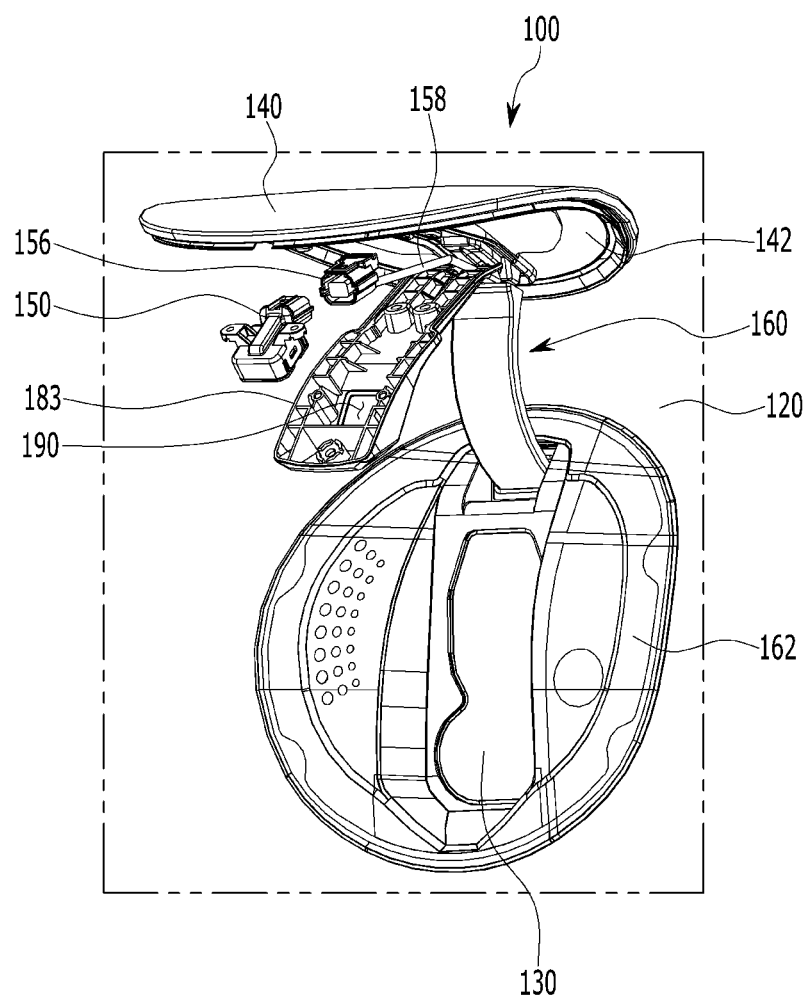
FIG. 2 is a partially exploded perspective view of a visible configuration of a system for illuminating a charging port of an electric vehicle according to an embodiment.

FIG. 2 is a partially exploded perspective view of a visible configuration of a system for illuminating a charging port of an electric vehicle according to an embodiment.

Figure 3:
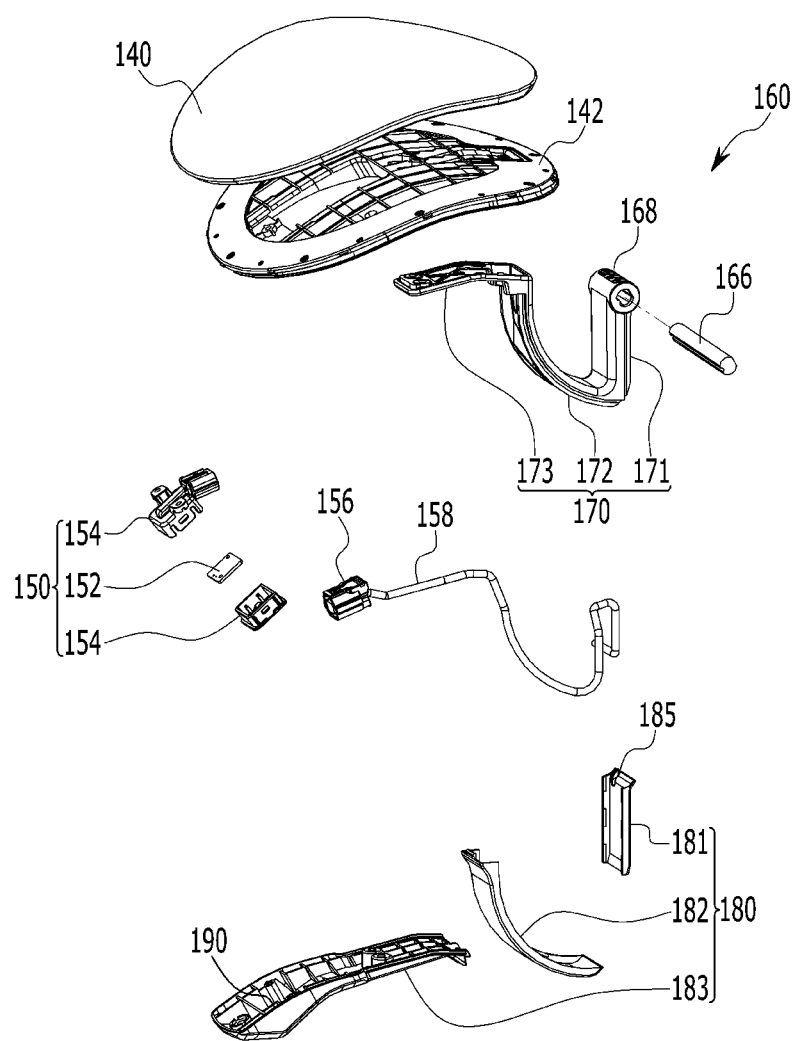
FIG. 3 is an exploded perspective view of a system for illuminating a charging port of an electric vehicle according to an embodiment.

FIG. 3 is an exploded perspective view of a system for illuminating a charging port of an electric vehicle according to an embodiment.

Referring to FIG. 1 and FIG. 2, a system 100 for illuminating a charging port of an electric vehicle according to an embodiment is a charging port illumination system for illuminating a charging port 130 provided to a vehicle body 120, to supply electrical power to a vehicle driving battery no of the electric vehicle.

The system 100 for illuminating a charging port of an electric vehicle according to an embodiment includes a charging port door 140 operable to open and close (i.e., cover) the charging port 130 and a lamp device 150 disposed on the charging port door 140 and configured to illuminate the charging port 130. As shown in FIG. 2, the lamp device 150 is configured to illuminate downward from the charging port door 140 when opened.

In more detail, the charging port door 140 is hinge-coupled to the vehicle body 120 through a hinge device 160 to be opened upward. In addition, the lamp device 150 is formed on an inner surface of the charging port door 140, and configured to emit light from the inner surface of the charging port door 140 (e.g., in a direction perpendicular to the inner surface of the charging port door 140) and illuminate downward when the charging port door 140 is open.

In the description of embodiments of the present disclosure, the vehicle body 120 does not merely refer to a frame of the vehicle, and may mean an outer panel of the vehicle or a frame within the outer panel or a fixture fixed to the frame.

The system 100 for illuminating a charging port of an electric vehicle according to an embodiment may further include a lamp wiring 158 disposed along the hinge device 160 to supply power to the lamp device 150, and a hinge cover 180 configured to cover the lamp wiring 158.

The hinge device 160 may include a hinge shaft 166 configured to provide hinge coupling, a hinge body 168 configured to rotate about the hinge shaft 166, and a hinge arm 170 configured to connect the hinge body 168 and the charging port door 140.

That is, as the hinge body 168 rotates about the hinge shaft 166, the hinge arm 170 rotates and accordingly, the charging port door 140 connected to the hinge arm 170 rotates to open and close the charging port 130.

The hinge arm 170 may include a first arm 171 protruding from the hinge body 168, a second arm 172 configured to connect an end of the first arm 171 and the charging port door 140, and a third arm 173 extending from an end of the second arm 172 in parallel with the charging port door 140, and coupled with the charging port door 140.

FIG. 3 illustrates that a door inner panel 142 is disposed on an inner side of the charging port door 140, and the third arm 173 is fixed to the charging port door 140 through the door inner panel 142. However, it may be understood that the present disclosure is not necessarily limited thereto.

The hinge cover 180 may include a first cover 181 configured to cover the first arm 171, a second cover 182 configured to cover the second arm 172, and a third cover 183 configured to cover the third arm 173. By dividing the hinge cover 180 in this way, it may be easy to assemble the hinge cover 180 to cover the hinge arm 170, which will be described later.

As shown in FIG. 3, in the lamp device 150, a lamp (for example, an LED) 152 is installed in a lamp case 154, and is connected to the lamp wiring 158 through a connector 156.

For example, the lamp case 154 may be formed into a single lamp module by embedding the LED 152 by fusion, and this structure may prevent inflow of foreign materials such as moisture and dust to the LED. The connector 156 may be formed as, for example, a waterproof connector, and with this structure, even if the charging port door 140 is opened while it is raining, it is possible to prevent a problem caused by moisture penetrating into the LED.

Figure 4A:
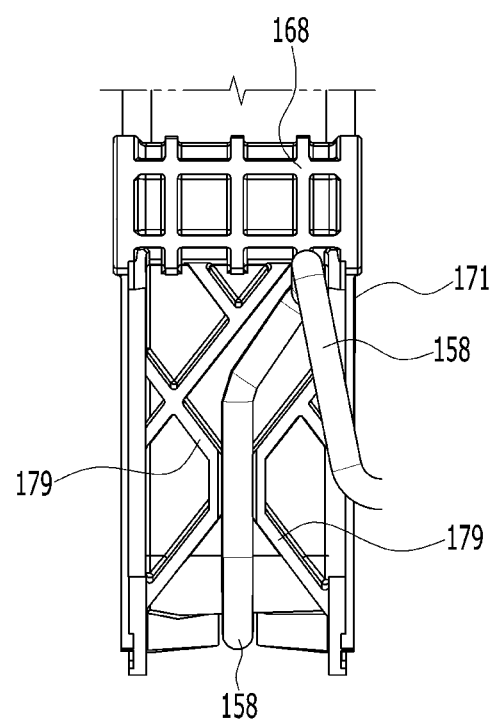
FIG. 4A illustrates a hinge body and a first arm of a hinge device according to an embodiment.

FIG. 4A illustrates the hinge body 168 and the first arm 171 of the hinge device 160 of FIG. 3.

Figure 4B:
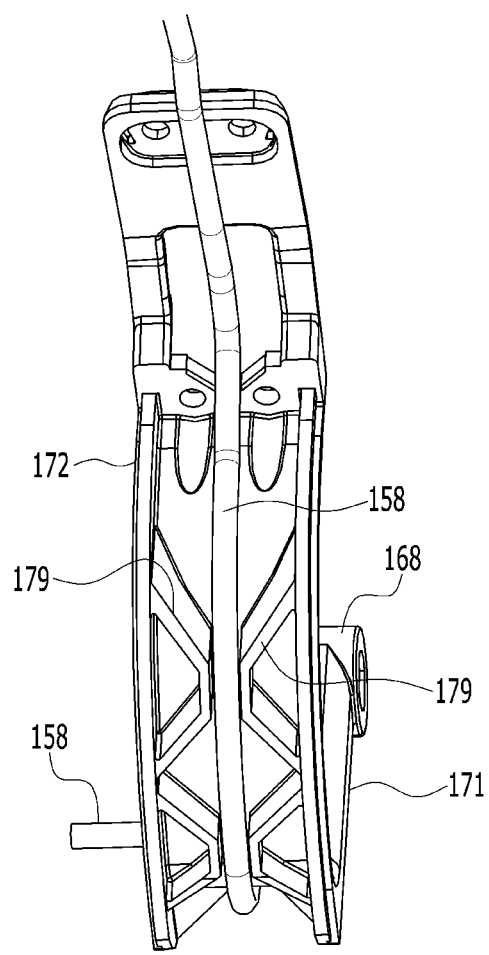
FIG. 4B illustrates a second arm of a hinge device according to an embodiment.

FIG. 4B illustrates the second arm 172 of the hinge device 160 of FIG. 3.

As shown in FIG. 4A and FIG. 4B, the hinge arm 170 includes at least one rib 179 protruding toward the hinge cover 180, and the lamp wiring 158 is fixed between the hinge arm 170 and the hinge cover 180 by the at least one rib 179.

Figure 6A:
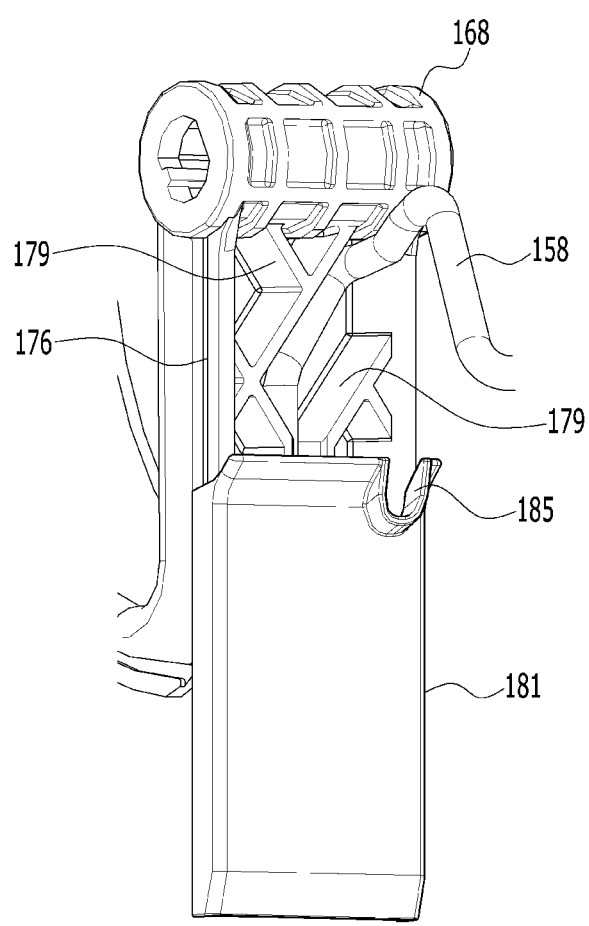
FIG. 6A is a perspective view showing that a first arm and a first cover in a hinge device according to an embodiment are slidably coupled.

In more detail, the rib 179 is formed on the first arm 171 and the second arm 172, respectively, and the lamp wiring 158 may be fitted and fixed in a space formed by the rib 179 (also refer to FIG. 6A).

In this way, by fixing the lamp wiring 158 to the rib 179 formed on the hinge arm 170, the motion of the lamp wiring 158 may be minimized when the hinge arm 170 is rotated to open and close the charging port door 140.

Figure 5A:
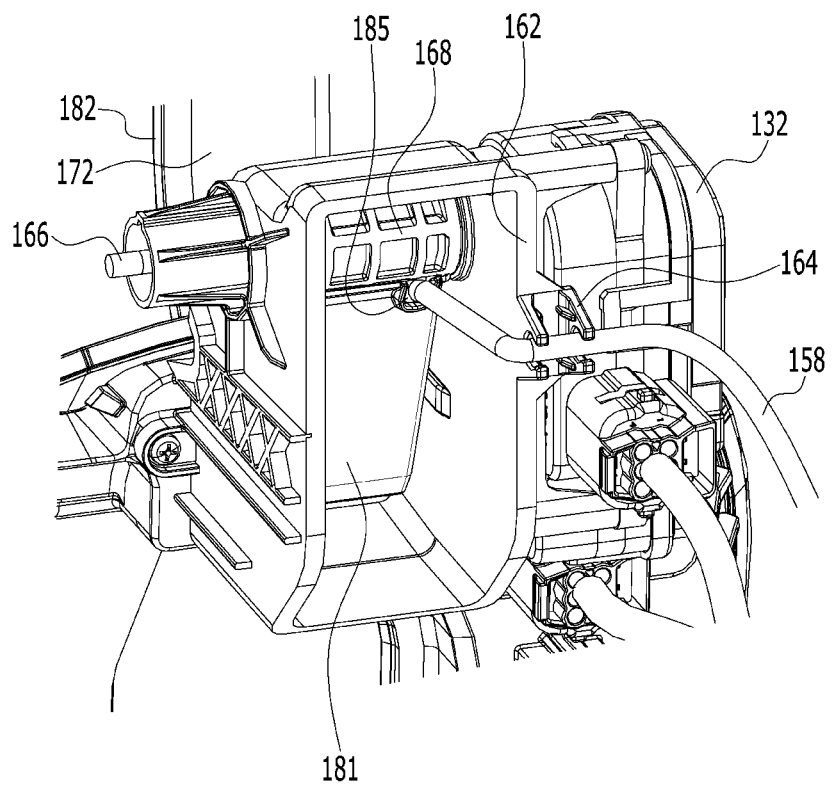
FIG. 5A and FIG. 5B are perspective views of a hinge device of an electric vehicle according to an embodiment, viewed from a vehicle interior side.
Figure 5B:
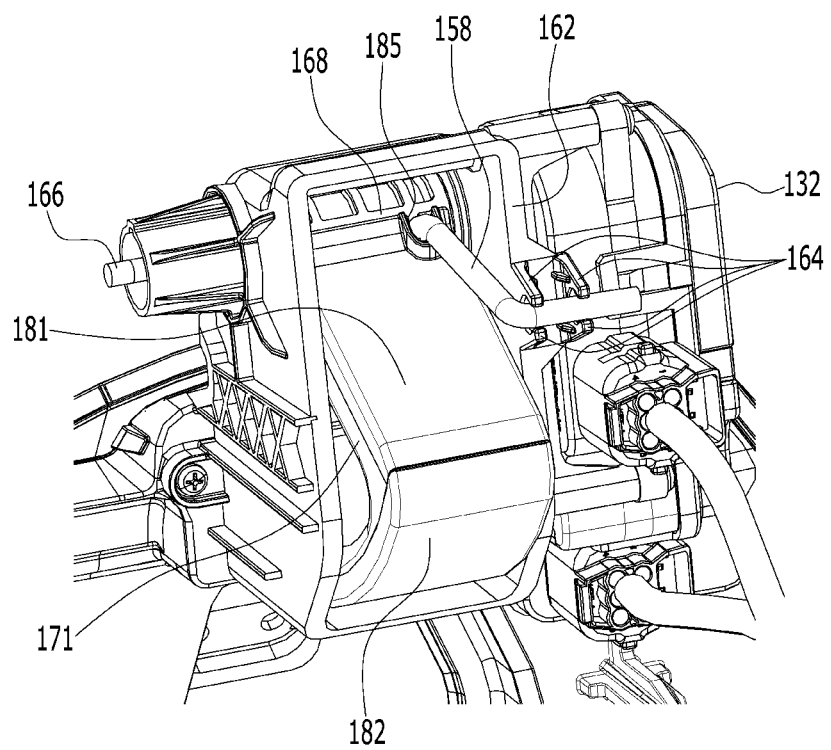

FIG. 5A and FIG. 5B are perspective views of a hinge device of an electric vehicle according to an embodiment, viewed from a vehicle interior side.

FIG. 5A and FIG. 5B show views when the charging port door 140 is opened and closed by the operation of the hinge device 160, respectively.

As shown in FIG. 5A and FIG. 5B, a wiring holding indentation 185 is formed between the hinge cover 180 and the hinge body 168.

Therefore, the lamp wiring 158 is fixed to the wiring holding indentation 185 as the hinge cover 180 is coupled to the hinge arm 170.

It may be understood that the wiring holding indentation 185 is configured to tightly hold the lamp wiring 158 drawn out from between the hinge body 168 and the hinge cover 180.

FIG. 5A and FIG. 5B illustrate that the wiring holding indentation 185 is formed on an upper end of the first cover 181 of the hinge cover 180, however the present disclosure is not limited thereto. As an exemplary variation, the wiring holding indentation 185 may be formed in the hinge body 168, and as another exemplary variation, the wiring holding indentation 185 may be formed in both of the hinge body 168 and the hinge cover 180 (specifically, the first cover 181).

The lamp wiring 158 fixed by the wiring holding indentation 185 is drawn out from the wiring holding indentation 185 and leads to inside of the vehicle.

In this way, since the lamp wiring 158 is fixed between the hinge body 168 and the hinge cover 180, the motion of the lamp wiring 158 may be minimized when the charging port door 140 is operated.

FIG. 6A is a perspective view showing that the first arm 171 and the first cover 181 in the hinge device 160 are slidably coupled.

Figure 6B:
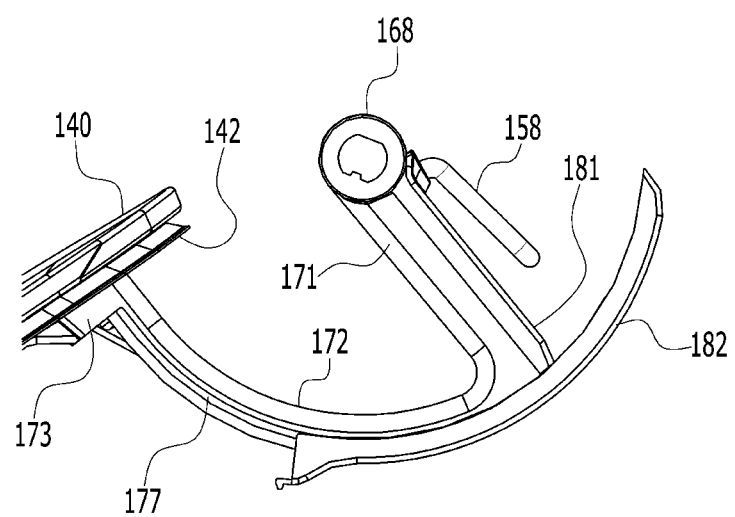
FIG. 6B is a side view showing that a second arm and a second cover in a hinge device according to an embodiment are slidably coupled.

FIG. 6B is a side view showing that the second arm 172 and the second cover 182 in the hinge device 160 are slidably coupled.

As shown in FIG. 6A, a first sliding groove 176 for being slidably coupled with the first cover 181 is formed on the first arm 171. On the other hand, as shown in FIG. 6B, a second sliding groove 177 for being slidably coupled with the second cover 182 is formed on the second arm 172.

Therefore, the first cover 181 is slidably coupled with the first arm 171 through the first sliding groove 176. Subsequently, the second cover 182 is slidably coupled with the second arm 172 through the second sliding groove 177.

By this coupling structure, the hinge arm 170, which is bent and has a complex shape, may be easily covered with the hinge cover 180 of the divided structure.

Meanwhile, the first cover 181 covering the first arm 171 formed up and down is first slidably coupled to the first arm 171, and then the second cover 182 covering the second arm 172 disposed below the first arm 171 is slidably coupled to the second arm 172. By this coupling sequence, for example, the second cover 182 may support the first cover 181, so the coupling of the first and the second covers 181 and 182 to the first and second arms 172 may be more robust.

Additionally, referring back to FIG. 5A and FIG. 5B, according to the system wo for illuminating a charging port of an electric vehicle according to an embodiment, a holding member 164 is formed to protrude from a hinge housing 162 of the hinge device 160.

Accordingly, a portion of the lamp wiring 158 from the wiring holding indentation 185 toward the inside of the vehicle is fixed by being tightly held by the holding member 164 formed on the hinge housing 162 of the hinge device 160.

According to the system wo for illuminating a charging port of an electric vehicle according to an embodiment, due to this structure, while the hinge device 160 operates for the opening and closing operation of the charging port door 140, the motion of the lamp wiring 158 may be minimized.

In more detail, in the motion area (i.e., first, second, and third arms) of the hinge device 160, the lamp wiring 158 is fixedly coupled to the first, second, and third arms 171, 172, and 173, and therefore, relative motion of the lamp wiring 158 does not occur when the charging port door 140 is opened and closed. On the other hand, it may be easily understood that motion does not occur at the lamp wiring 158 that leads to inside of the vehicle after the holding member 164 when the charging port door 140 is opened and closed. Therefore, it may be understood that the portion of the lamp wiring 158 in which the motion occurs by opening and closing the charging port door 140 is only a section from the wiring holding indentation 185 to the holding member 164.

Therefore, according to the system wo for illuminating a charging port of an electric vehicle according to an embodiment, the motion of the lamp wiring 158 according to opening and closing of the charging port door 140 may be minimized, and accordingly, it is possible to minimize the possibility of problems such as detachment/wear in the lamp wiring 158 according to the opening and closing of the charging port door 140.

As shown in FIG. 5A and FIG. 5B, the charging port 130 may be fixed within a charging port housing 132. The charging port housing 132 may be integrally formed with the hinge housing 162, but the present disclosure is not limited thereto.

Meanwhile, referring back to FIG. 2, according to the system wo for illuminating a charging port of an electric vehicle according to an embodiment, a light transmitting window 190 is formed in the hinge cover 180, for example, at an end facing an outer end of the charging port door 140. In addition, the lamp device 150 is coupled with an inner surface of the hinge cover 180 to illuminate through the light transmitting window 190.

As shown in FIG. 2, the light transmitting window 190 may be formed, for example, as a penetration hole formed in the third cover 183. However, the present disclosure is not limited thereto. As an exemplary variation, the third cover 183 may be formed as a window member of a transparent material at the penetration hole portion shown in FIG. 2.

The third cover 183 may be coupled to the charging port door 140 (e.g., through the door inner panel 142) in various ways, for example, by screw coupling, fitting, or the like.

That is, according to the system wo for illuminating a charging port of an electric vehicle according to an embodiment, the lamp device 150 is disposed between the charging port door 140 and the hinge cover 180, the lamp device 150 is fixed as the hinge cover 180 is coupled to the charging port door 140, and the lamp device 150 is configured to emit light through the light transmitting window 190 formed in the hinge cover 180.

According to this structure, when the lamp device 150 needs to be replaced due to the occurrence of abnormality of the lamp device 150, the lamp device 150 may be easily separated from the connector 156 for the replacement by detaching only the hinge cover 180, for example, in the present embodiment, by detaching only the third cover 183.

Hereinafter, a method for illuminating a charging portion of an electric vehicle by using the system wo for illuminating a charging port of an electric vehicle according to an embodiment is described in detail with reference to the drawings.

Figure 7:
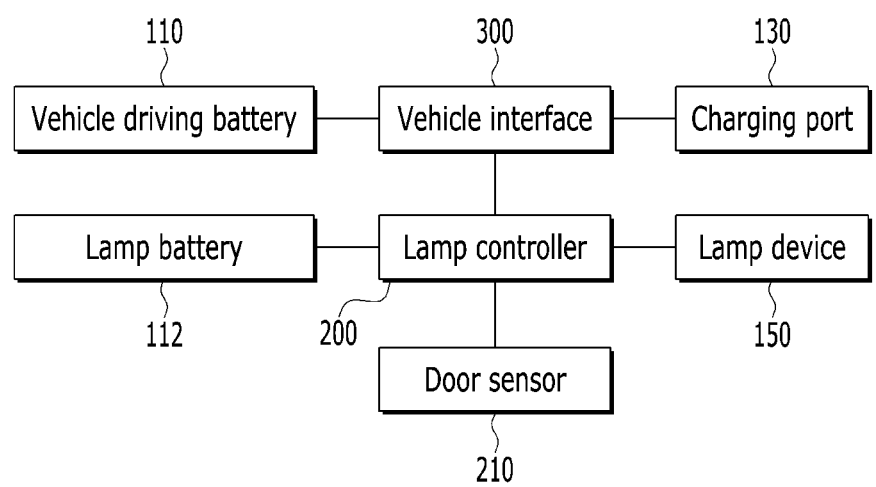
FIG. 7 is a block diagram showing a control configuration of a system for illuminating a charging port of an electric vehicle according to an embodiment.

FIG. 7 is a block diagram showing a control configuration of the system 100 for illuminating a charging port of an electric vehicle according to an embodiment.

Figure 8:
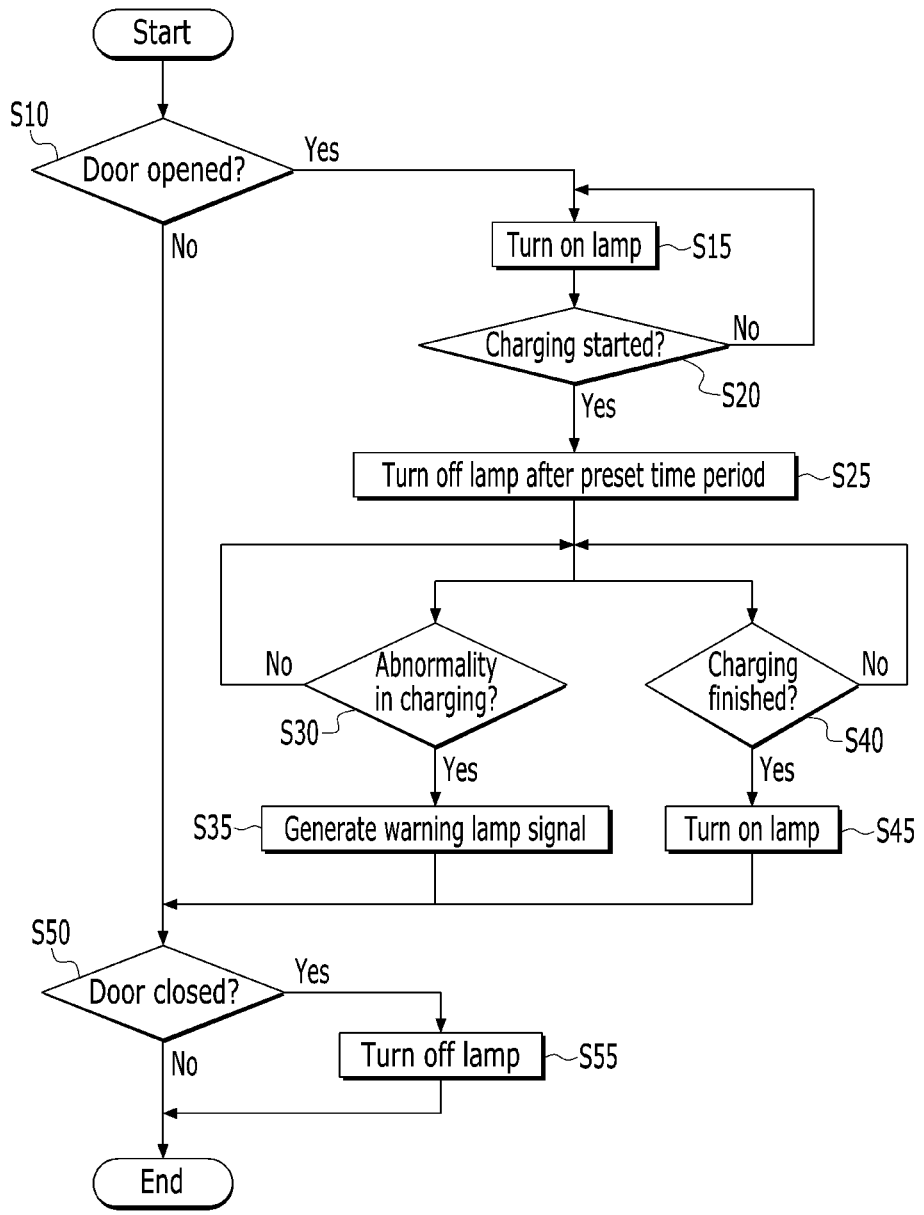
FIG. 8 is a flowchart showing a method for illuminating a charging port of an electric vehicle according to an embodiment.

FIG. 8 is a flowchart showing a method for illuminating a charging port of an electric vehicle according to an embodiment.

As shown in FIG. 7, the system wo for illuminating a charging port of an electric vehicle according to an embodiment may further include a door sensor 210 configured to detect opening of the charging port door 140, a lamp battery 112 for supplying electricity to the lamp device iso, and a lamp controller 200 configured to control the supplying of electricity from the lamp battery 112 to the lamp device 150 based on a signal from the door sensor 210.

The door sensor 210 may be implemented in various ways, such as a push button switch, a proximity sensor, or the like, capable of detecting opening and closing of the door. In addition, when a motor for operating the charging port door 140 is provided, the opening and closing of the charging port door 140 may be detected from a position of the motor, and in this case, the motor for operating the charging port door 140 may be understood as the door sensor 210. As such, in the present disclosure, the door sensor 210 is not limited to a specific embodiment.

Although FIG. 7 illustrates the lamp battery 112 as a separate battery (e.g., a 12V battery, a 24V battery, and the like) from the vehicle driving battery 110, the present disclosure is not limited thereto. For example, the vehicle driving battery no may be used as an electric power source to activate the lamp device 150.

Therefore, in the interpretation of the present disclosure and the accompanying claims, the lamp battery 112 is not necessarily interpreted to be separate from the vehicle driving battery 110.

The lamp controller 200 may obtain charged state information of the vehicle driving battery no through a vehicle interface 300. For example, the electricity supplied through the charging port 130 may be charged to the vehicle driving battery no under the control of a vehicle charging management system (VCMS), and the vehicle driving battery 110 may be managed by a battery management system (BMS). The lamp controller 200 may obtain the charged state information of the vehicle driving battery no from the VCMS and/or the BMS through the vehicle interface 300.

Accordingly, the lamp controller 200 may control supplying of electricity to the lamp device 150, in further consideration of the charged state information of the vehicle driving battery 110.

The lamp controller 200 may be implemented with at least one microprocessor operated by a preset program. This preset program may include a series of instructions for performing each step included in a method for illuminating a charging port of an electric vehicle according to an embodiment, which is described below.

The lamp controller 200 may be formed separate from or integrated with another controller (e.g., a charging port door controller and the like configured to control the opening and closing of the charging port door 140).

Hereinafter, a method for illuminating a charging port of an electric vehicle according to an embodiment is described in detail with reference to FIG. 8.

First, at step S10, the lamp controller 200 determines whether the charging port door 140 is opened. Such determining step S10 may be performed based on a signal from the door sensor 210.

When the charging port door 140 is opened (S10—Yes), the lamp controller 200 supplies electricity to the lamp device 150 to turn on the lamp device 150, at step S15. At the step S15, the lamp device 150 illuminates downward from the charging port door 140 toward the charging port 130.

Meanwhile, when the charging port door 140 is not opened (S10-No), the lamp controller 200 determines whether the charging port door 140 is closed, at step S50.

When the charging port door 140 is closed (S50—Yes), the lamp controller 200 cuts off the supplying of electricity to the lamp device 150 to turn off the lamp device 150, at step S55.

By such basic operation, the lamp controller 200 is configured to illuminate the charging port 130 by the lamp device 150 when the charging port door 140 is opened, i.e., when the opening of the charging port door 140 is detected, and to turn off the lamp device 150 when the charging port door 140 is closed, i.e., when the closing of the charging port door 140 is detected.

After turning on the lamp device 150 at the step S15, the user plugs in a charger outlet (not shown) of a charging station (not shown) into the charging port 130 and initiates the charging.

At this time, after the step S15 of turning on the lamp device 150 by the opening of the charging port door 140, the lamp controller 200 additionally determines, at step S20, whether charging of the vehicle driving battery 110 is started. Such determining step S20 may be performed, for example, by determining whether a signal notifying a charging start is received from the vehicle interface 300.

When the charging of the vehicle driving battery 110 is not started (S20-No), the lamp controller 200 may maintain the turn-on of the lamp device iso.

When the charging of the vehicle driving battery 110 is started (S20—Yes), the lamp controller 200 may turn off the lamp device 150, at step S25, after a preset time period. The preset time period may be set to any time period that the user is expected to be able to check the charging status or perform other operations after the charging is started, and may be set to 2 minutes, for example.

After the lamp device 150 is turned off after the preset time period after the charging of the vehicle is started, the lamp controller 200 determines, at step S30, whether a charging abnormality occurs. The determining step S30 may be performed based on whether a signal notifying the charging abnormality is received from the vehicle interface 300.

Here, the charging abnormality may correspond to, for example, a case that the electricity is not stably supplied through the charging port 130, e.g., due to faulty engagement of the charger outlet to the charging port 130, a case that the charging is defective, e.g., due to abnormality of a state of charge (SOC) of the vehicle driving battery, or other cases that may be considered as the charging abnormality. When such a charging abnormality occurs, the vehicle interface 300 may generate a signal notifying the charging abnormality and send it to the lamp controller 200, and the lamp controller 200 may determine the charging abnormality based on whether the signal notifying the charging abnormality is received.

When the charging abnormality occurs, that is, when the lamp controller 200 detects the charging abnormality (S30—Yes), the lamp controller 200 generates a preset warning lamp signal through the lamp device 150, at step S35. The warning lamp signal may be generated in any sequence to attract the user's attention, for example, it may be blinking the lamp device 150 10 times.

Meanwhile, after the charging is started and the lamp device 150 is turned off after the preset time period, the lamp controller 200 determines, at step S4o, whether the charging is finished. The determining step S40 may be performed based on whether a signal notifying a charging finish is received from the vehicle interface 300.

Here, the charging finish may include a case that the charging is terminated when the vehicle driving battery no is fully charged, a case that the charging is terminated when the user disconnects the charger outlet from the charging port 130, and the like. When the charging finish occurs, the vehicle interface 300 may generate a signal notifying the charging finish and send it to the lamp controller 200, and the lamp controller 200 may determine the charging finish based on whether the signal notifying the charging finish is received.

When the charging is finished, that is, when the lamp controller 200 detects the charging finish (S40—Yes), the lamp controller 200 turns on the lamp device 150 to illuminate the charging port 130, at step S45. By such a process, when the charging is finished, the user may easily disconnect the charger outlet from the charging port 130 that is illuminated by the lamp device iso.

According to a system and method for illuminating a charging port of an electric vehicle according to an embodiment, by illuminating the charging port from the charging port door, it is possible to illuminate the charging port in a wider range.

In addition, according to a system and method for illuminating a charging port of an electric vehicle according to an embodiment, by illuminating the charging port downward from the charging port door, glare or the like is not caused in the user's field of view, and the convenience of use may be improved.

In addition, according to a system and method for illuminating a charging port of an electric vehicle according to an embodiment, by effectively disposing the lamp wiring connected to the lamp device disposed on the charging port door, the stability of the charging port illumination may be improved.

In addition, according to a system and method for illuminating a charging port of an electric vehicle according to an embodiment, the lamp device may be easily replaced when an abnormality occurs in the lamp device disposed on the charging port door.

In addition, according to a system and method for illuminating a charging port of an electric vehicle according to an embodiment, user convenience may be improved by effectively turning on and off the lamp device according to the opening and closing of the charging port door during the charging process of the electric vehicle.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A system for illuminating a charging port of an electric vehicle, the charging port being provided in a vehicle body for supplying electrical power to a vehicle driving battery, the system comprising:
   a charging port door configured to open and close the charging port, wherein the charging port door is hinge-coupled to the vehicle body through a hinge device configured to be opened upward and wherein the hinge device comprises:
     a hinge shaft configured to provide hinge coupling;
     a hinge body configured to rotate about the hinge shaft; and
     a hinge arm configured to connect the hinge body and the charging port door, wherein the hinge arm comprises:
       a first arm protruding from the hinge body, wherein a first sliding groove is formed on the first arm;
       a second arm configured to connect the first arm and the charging port door, wherein a second sliding groove is formed on the second arm; and
       a third arm extending in parallel with the charging port door from an end of the second arm and coupled with the charging port door;
   a lamp device disposed on an inner surface of the charging port door and positioned to illuminate the charging port, wherein the lamp device is configured to emit light from the inner surface of the charging port door;
   a lamp wiring disposed along the hinge device and configured to supply power to the lamp device; and
   a hinge cover configured to cover the lamp wiring, wherein the hinge cover comprises:
     a first cover configured to cover the first arm and slidably coupled with the first arm through the first sliding groove;
     a second cover configured to support the first cover and cover the second arm, the second cover being slidably coupled with the second arm through the second sliding groove; and
     a third cover configured to cover the third arm.

2. The system of claim 1, wherein the lamp device is configured to illuminate downward from the charging port door when the charging port door is in an opened state.

3. The system of claim 1, wherein:
   the hinge arm comprises a rib protruding toward the hinge cover; and
   the lamp wiring is fixed between the hinge arm and the hinge cover by the rib.

4. The system of claim 1, wherein:
   a wiring holding indentation is formed between the hinge cover and the hinge body;
   the lamp wiring is fixed to the wiring holding indentation as the hinge cover is coupled to the hinge arm; and
   the lamp wiring leads to inside of the vehicle through the wiring holding indentation.

5. The system of claim 4, wherein a portion of the lamp wiring from the wiring holding indentation toward the inside of the vehicle is fixed by being tightly held by a holding member formed on a hinge housing of the hinge device.

6. The system of claim 1, wherein:
a light transmitting window is formed at the hinge cover; and
the lamp device is coupled with an inner surface of the hinge cover and configured to illuminate through the light transmitting window.

7. The system of claim 1, further comprising:
a door sensor configured to detect opening and closing of the charging port door; and
a lamp controller configured to control supplying of electricity to the lamp device based on a signal from the door sensor.

8. The system of claim 7, wherein the lamp controller is configured to control the supplying of the electricity to turn on the lamp device in response to detection of the opening of the charging port door, and to turn off the lamp device in response to detection of the closing of the charging port door.

9. The system of claim 7, wherein the lamp controller is configured to turn off the lamp device after a preset time period when a start of charging of the vehicle driving battery is detected after turning on the lamp device.

10. The system of claim 9, wherein the lamp controller is further configured to, after turning off the lamp device after the preset time period, generate a preset warning signal through the lamp device when an abnormality of the charging is detected.

11. The system of claim 9, wherein the lamp controller is further configured to, after turning off the lamp device after the preset time period, turn on the lamp device when a finish of the charging is detected.

12. A method for illuminating the charging port of claim 1, the method comprising:
detecting opening of the charging port door;
turning on the lamp device to illuminate downward from the charging port door toward the charging port, in response to detecting the opening of the charging port door;
detecting closing of the charging port door; and
turning off the lamp device in response to detecting the closing of the charging port door.

13. The method of claim 12, further comprising:
detecting a start of charging the vehicle driving battery after turning on the lamp device; and
turning off the lamp device after a preset time period after detecting the start of the charging.

14. The method of claim 13, further comprising, after turning off the lamp device after the preset time period:
detecting an abnormality of the charging; and
generating a preset warning signal through the lamp device in response to detecting the abnormality of the charging.

15. The method of claim 13, further comprising, after turning off the lamp device after the preset time period:
detecting a finish of the charging; and
turning on the lamp device in response to detecting the finish of the charging.

* * * * *